United States Patent
Ko et al.

(10) Patent No.: US 12,013,500 B2
(45) Date of Patent: Jun. 18, 2024

(54) APPARATUS FOR MEASURING RADON AND THORON BY USING IONIZATION CHAMBER

(71) Applicant: FTLAB CO., LTD., Ansan-si (KR)

(72) Inventors: Jae Jun Ko, Seoul (KR); Young Gweon Kim, Anyang-si (KR)

(73) Assignee: FTLAB CO., LTD., Ansan-si (KR)

( * ) Notice: Subject to any disclaimer, the term of this patent is extended or adjusted under 35 U.S.C. 154(b) by 658 days.

(21) Appl. No.: 16/973,418

(22) PCT Filed: Oct. 24, 2019

(86) PCT No.: PCT/KR2019/014018
§ 371 (c)(1),
(2) Date: Dec. 8, 2020

(87) PCT Pub. No.: WO2020/130317
PCT Pub. Date: Jun. 25, 2020

(65) Prior Publication Data
US 2021/0255339 A1 Aug. 19, 2021

(30) Foreign Application Priority Data
Dec. 19, 2018 (KR) .......... 10-2018-0165343

(51) Int. Cl.
*G01T 1/185* (2006.01)
*G01T 1/178* (2006.01)
(Continued)

(52) U.S. Cl.
CPC .......... *G01T 1/185* (2013.01); *G01T 1/178* (2013.01); *G01T 1/24* (2013.01); *H01J 47/026* (2013.01)

(58) Field of Classification Search
CPC . G01T 1/185; G01T 1/178; G01T 1/24; H01J 47/026
See application file for complete search history.

(56) References Cited

U.S. PATENT DOCUMENTS

| | | | |
|---|---|---|---|
| 6,288,400 B1* | 9/2001 | Negro | G01T 1/178 250/382 |
| 2003/0030444 A1* | 2/2003 | Kogawa | G01T 1/178 324/464 |
| 2004/0232345 A1* | 11/2004 | Jagam | G01T 1/178 250/370.02 |

FOREIGN PATENT DOCUMENTS

| | | |
|---|---|---|
| JP | 08-136663 A | 5/1996 |
| JP | 2012-002736 A | 1/2012 |

(Continued)

OTHER PUBLICATIONS

International Search Report and Written Opinion for International application No. PCT/KR2019/014018, Feb. 5, 2020, ISA/KR.

*Primary Examiner* — David P Porta
*Assistant Examiner* — Fani Polyzos Boosalis
(74) *Attorney, Agent, or Firm* — ArentFox Schiff LLP

(57) ABSTRACT

An apparatus for measuring radon and thoron using an ionization chamber is proposed. The apparatus includes: a pump for air inflow suctioning and sending external air to at least one channel; a first sensor module outputting an alpha particle detection signal of an electrical signal by detecting alpha (α) particles discharged from radon and thoron; an air inflow delay module delaying air for a predetermined delay time and then outputting the air; a second sensor module outputting an alpha particle detection signal of an electrical signal by detecting alpha (α) particles discharged from radon and thoron; and a control module discriminating normal or abnormal alpha particle detection signals, counting the normal alpha particle detection signals discriminated for a predetermined measurement time, and calculating radioactive ray concentration values on the basis of the counted number of times of the normal alpha particle detection signals.

27 Claims, 7 Drawing Sheets

(51) Int. Cl.
    *G01T 1/24*    (2006.01)
    *H01J 47/02*   (2006.01)

(56)         References Cited

FOREIGN PATENT DOCUMENTS

| KR | 101226735 B1    | 1/2013 |
| KR | 10-1583056 B1   | 1/2016 |
| KR | 10-2017-0023599 A | 3/2017 |
| KR | 10-2017-0023601 A | 3/2017 |
| KR | 101730887 B1    | 4/2017 |

* cited by examiner

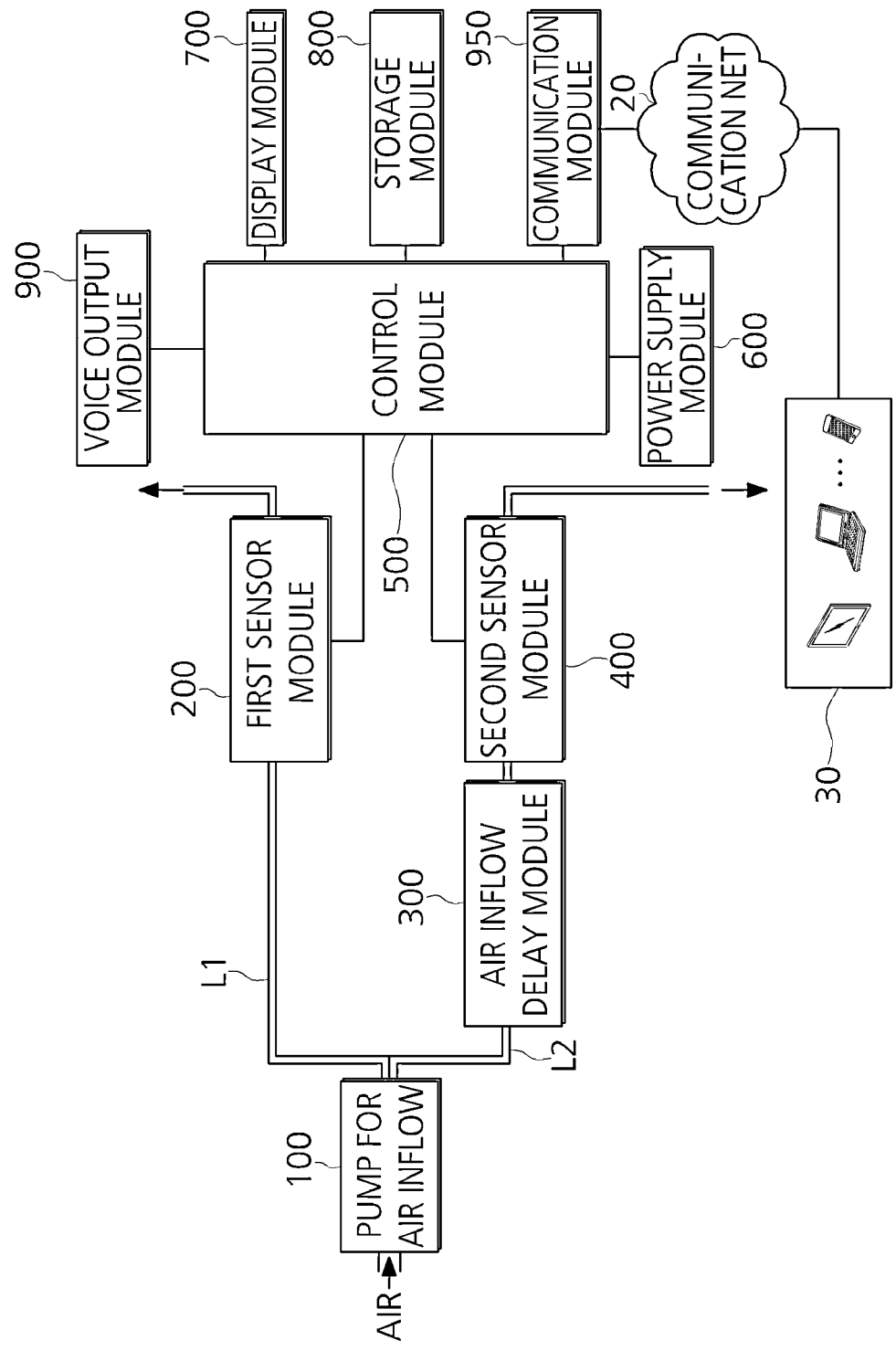
[FIG. 1]

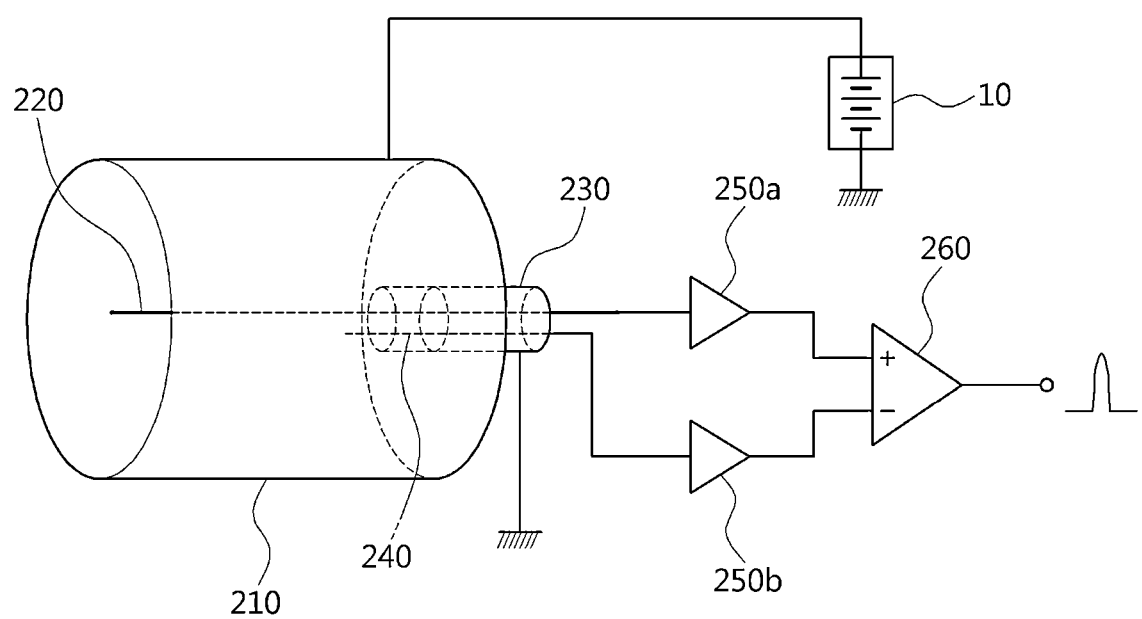
[FIG. 2]

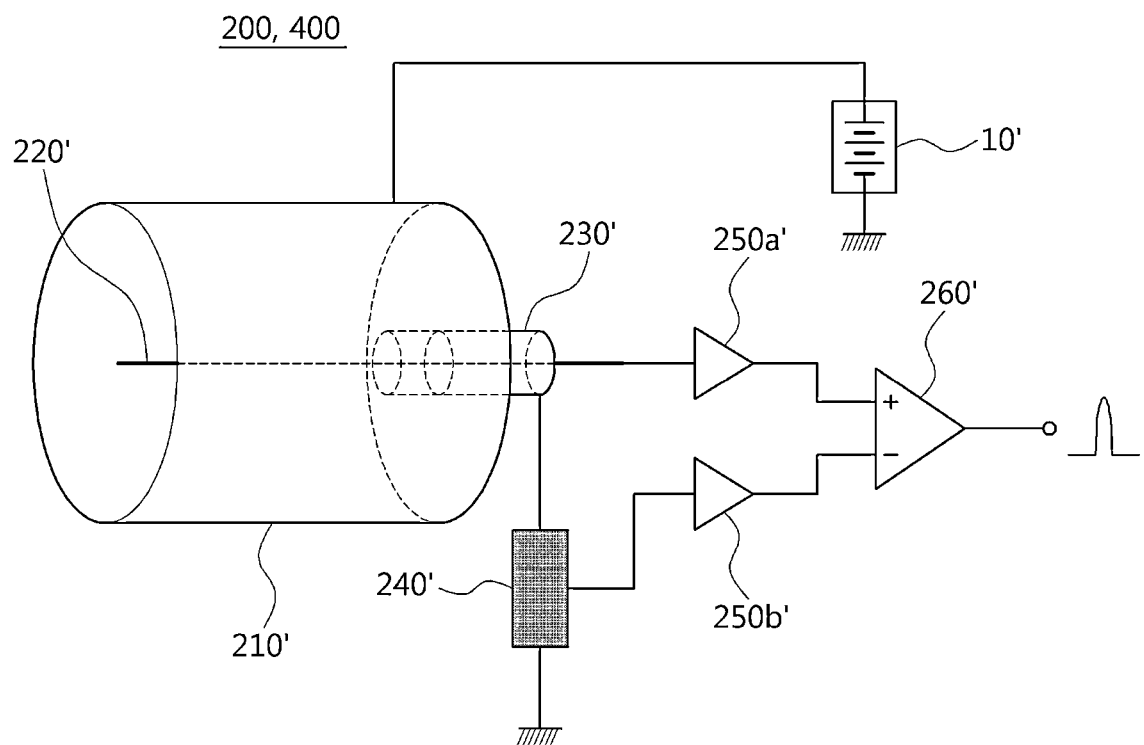
[FIG. 3]

[FIG. 4]
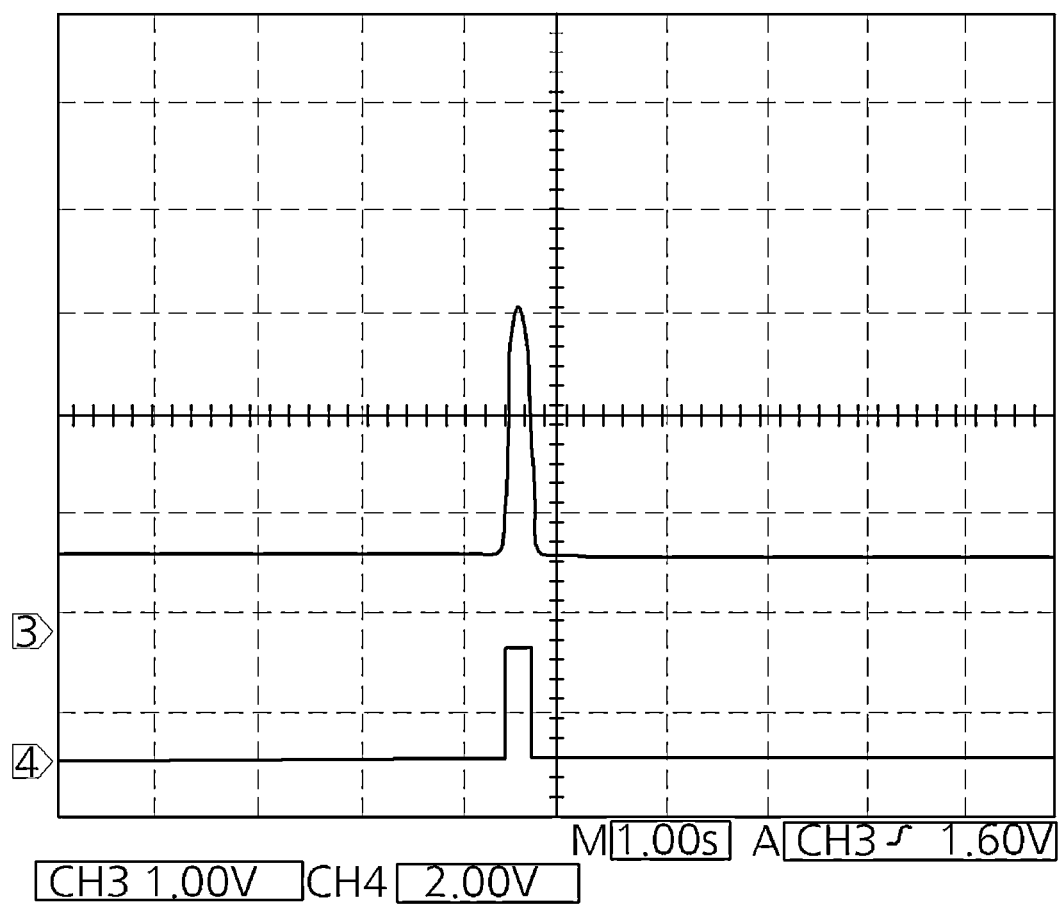

[FIG. 5]
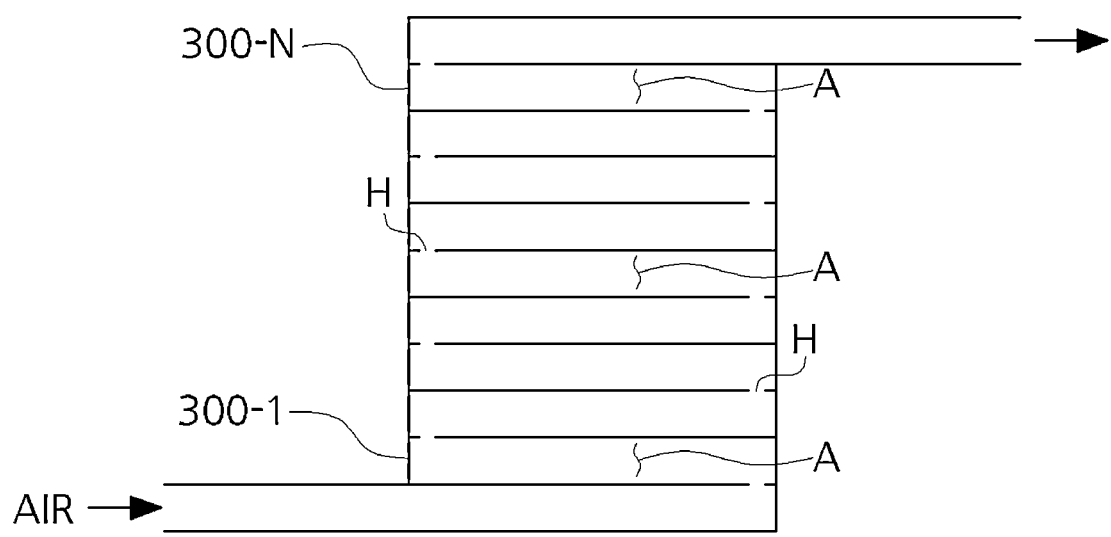

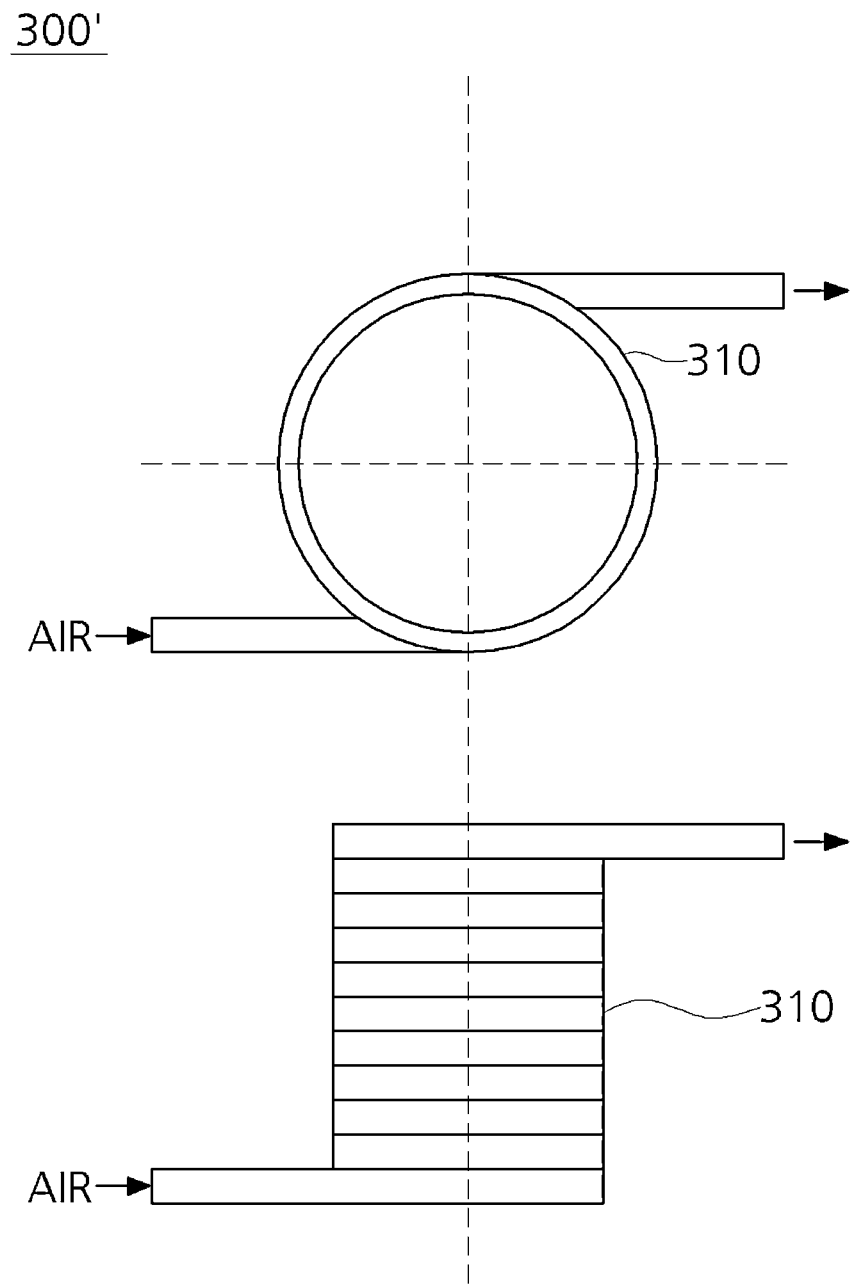
[FIG. 6]

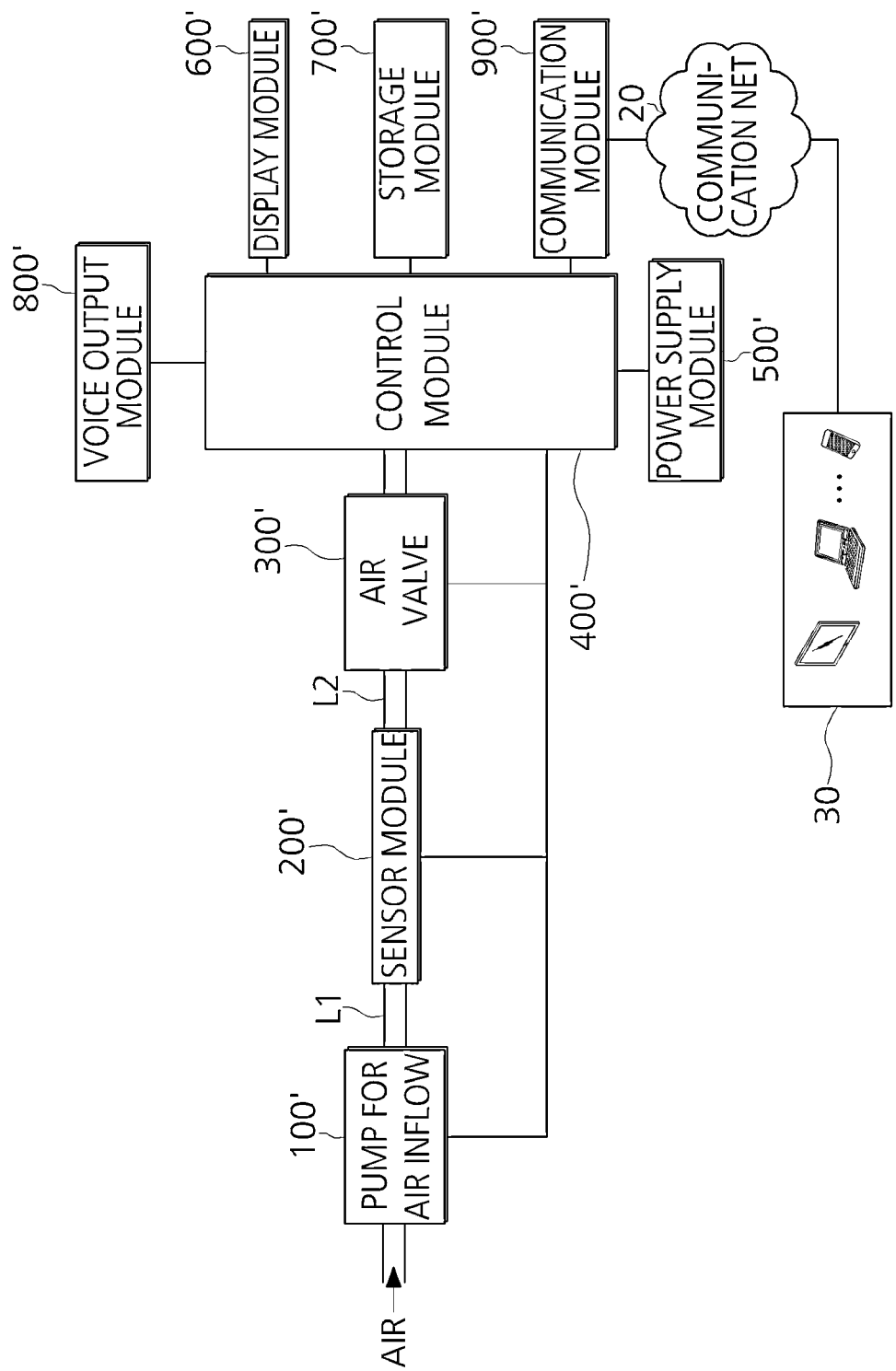

APPARATUS FOR MEASURING RADON AND THORON BY USING IONIZATION CHAMBER

CROSS-REFERENCE TO RELATED APPLICATION

This application is a 371 U.S. national stage of PCT/KR2019/014018, filed Oct. 24, 2019, which claims the benefit of Korean Patent Application No. 10-2018-0165343 filed Dec. 19, 2019 and the contents of each of which are incorporated herein by reference.

TECHNICAL FIELD

The present disclosure relates to an apparatus for measuring radon and thoron using an ionization chamber making it possible to easily separately measure radon (Rn-222) and thoron (Rn-220) using the feature that there is a great difference in half-life between radon and thoron in a radon measurer using an ionization chamber.

BACKGROUND ART

In general, a human body is usually exposed to the background radiation existing in nature, and as the background radiation, there are an alpha ray, a beta ray, and a gamma ray that are emitted from radioisotopes existing in the atmosphere, soil, or rocks, a cosmetic ray that comes from the space and is radiated to the human body together with the sunray, etc.

Further, other than the background radiation, the human body is exposed to artificial radioactive rays that are generated by facilities of civilization (medical radioactive rays and radioactive rays generated by all products including electronic products such as a TV, a fluorescent light, and a computer, machines, and transportation means).

The radioactive rays that are radiated to the human body, as described above, influence the human body in various ways, so IAEC has established a recommended level of 3 mSv (radiation unit of radioactive ray) per year. Accordingly, Korea has established a radioactive ray safety guide tolerance such that the exposure dose of radioactive rays by manufactured goods do not exceed 1 mSv per year.

In particular, radiation of the alpha radioactive ray due to radon (Rn-222) gas included in the air and accounting for 50% or more of the radiation dose radiated to human of the background radiation is specifically separately managed. In general, although different in each country, it is recommended to maintain the radon concentration in the atmosphere at the level of about 60 to 200 Bq/m$^3$. Korea has set the radon density at 4 pCi/1(148 Bq/m$^3$) as a recommended reference for the indoor air quality.

About 40 kinds of radioisotopes exist in radon classified as a radioactive gas and two kinds of these radon classified, that is, Rn-222 with a half-life of 3.8 days and Rn-220 with a half-life of 56 seconds are the most stable. The other radon classified of radon has a half-life of 1 seconds or shorter, so they are very unstable and are almost not found in only small amounts in the atmosphere.

Rn-220 having a half-life of 56 seconds is a radioisotope of radon, but comes from the decay chain of thorium (Th), unlike Rn-222 coming from the decay chain of uranium (U), so it is separately called thoron. Thoron practically does not exist outside due to the short half-life and is practically not found inside when it is spaced only about 50 cm from the wall or the floor. Accordingly, the recommended reference of indoor radon concentration for each country described above is based on Rn-222, the substance that we usually called "radon" is Rn-222, and Rn-220 is separately called thoron.

As described above, radon gas that is the main factor of exposure to radioactive rays for general people continuously moves up to the ground through the soil, gravel, or the like surrounding buildings and permeates into the interior through spaces in the buildings or pores in concrete. It has been known that radon permeating from the surrounding soil is the main factor of indoor radon, and the construction materials such concrete, plaster boards, gavel, bricks are also the factors contaminating indoor radon.

Since radon is easily dissolved in water, radon also flows into the interior through movement of underwater. Permeation into the interior with water is made by the capillary action through the pores in concrete or by pressure, and the higher the indoor temperature and the lower the pressure, the more the radon gas flows into the interior.

When the radon gas existing in the atmosphere is inhaled into the lungs through breathing, the alpha-particle radioactive rays emitted from radon are directly radiated to the lung tissues and the lung tissues are destroyed. Accordingly, radon is a first-class carcinogenic substance that has very strong biological influence on human such as causing lung cancer.

In order to accurately estimate the indoor concentration of radon that greatly influences human health, as described above, various measurers and various measurement methods and apparatuses have been developed and used. However, since radon is a colorless and ordorless inactive gas and has no reactivity, it is difficult to directly measure radon. Accordingly, since the frequency of alpha particles generated in alpha ($\alpha$) decay of radon is proportioned to radon concentration, the indoor radon concentration is measured by detecting alpha particles in the atmosphere. That is, accurately measuring alpha particles is the method of accurately measuring indoor radon concentration.

In general, a surface barrier type detector, a high-purity type semiconductor (pure Ge) detector, a scintillation detector, a solid state junction counter, a pulsed ionization chamber, etc. are used ad devices for detecting alpha particles.

As for the surface barrier type detector, since a depletion layer such as p-n junction is formed the surface of a semiconductor due to a surface level or an oxidation film, the portion around the surface acts as an obstacle of charge movement. Practically, gold is deposited by 100 μm/cm$^2$ on the surface of n-type si, this is used as one electrode and radioactive rays are radiated to the other surface.

The thickness of the depletion layer is various as about 5~500 μm and the loss of energy is small on the surface, so it is usually used to detect charged particles generated by alpha radioactive rays. Further, since energy resolution is good, it is possible to discriminate radon and thoron using the energy difference of alpha particles discharged from the radon and the thoron. This is called alpha spectroscopy.

A defect of alpha spectroscopy is that using a forcible circulation pump is required because a closed type is required to block external light and thus air flow is not smooth. Further, since charged particles can be measured only when they hits against the surface of a semiconductor, it is required to apply a relatively high bias voltage. Further, since a semiconductor detection element having a relatively large surface area is required, the cost is high and the detection efficiency is low due to the limit of 2D measurement.

The high-purity semiconductor detector is also generally called a pure Ge detector. High-purity Ge crystal with very low concentration of impurities and small defect is used, the electrical resistance is very high at a low temperature, and a high bias voltage can be applied. The difference from Ge (Li) is that it can be kept at a room temperature and it has only to be cooled into liquid nitrogen only when it is measured. Accordingly, it can be conveniently maintained and the energy resolution is good in comparison to Ge (Li), so it is practically used. However, the price is very expensive and cooling into liquid nitrogen is necessary, so there is a defect that the volume is large.

As for the scintillation detector, it has been known for a long time that light is emitted when a charged particle hits against a substance, but light emission by alpha radioactive rays of a zinc sulfide (ZnS) or NaI coating film is particularly intense, and detecting and counting are possible through a magnifier in a dark room.

Such light emission is called scintillation and substances showing this phenomenon are called scintillators. Further, a device formed by coupling a photomultiplier to a scintillator is called a scintillation detector, but a type that uses pulse output for counting is called scintillation counter.

Meanwhile, a device employing a method of reading output in series is usually used to dose measurement and uses scintillators, so it is called a scintillator dosimeter. Anything such as a solid, liquid, and gas is used as a scintillator, and when liquid is used, it is called liquid scintillator counter. The advantage is that the sensitivity is very high and the defect is that a zinc sulfide (ZnS) or NaI coating film is weak to humidity, so durability is low. Further, an expensive photomultiplier is necessary, so the price is very high.

The liquid junction counter is a counter designed to collect ion charges from alpha particles passing through a depletion layer as a liquid reverse bias p-n junction semiconductor and can be manufactured in a small size and a movable type. However, there is a problem that the metal electrode surface of the detector should not be scratched or pilled and external light should not travel into the counter. Recently, by configuring a measurement sensor into a ion chamber type to be protected from light and dust, this counter is usually used to slowly measure indoor radon concentration in a common and temporal type (it takes 24~48 hours to initially display data). However, the sensitivity is 0.02~0.03CPM/pCi/l, which is very low, so the counter is not used as a real-time alpha particle detector. Recently, by configuring a measurement sensor into an ion chamber to be protected from light and dust, the counter is usually used to slowly detect indoor radon concentration in a common and temporal type (it takes 2448 hours only to initially display data), but the sensitivity is very low as 0.02~0.03CPM/pCi/l, so it is not used as a real-time alpha particle detector.

A pulsed ionization chamber has a structure in which a probe type electrode is disposed at the center in a metallic cylindrical box and an electric field is generated by applying a bias voltage between the metallic cylinder and the probe.

When alpha decay occurs and alpha particles are discharged in such an ionization chamber, the alpha particles are extinguished by hitting against the air, but ion charges are generated. Accordingly, it is possible to detect the alpha particles by absorbing the ion charges through the probe at the center and amplifying a signal. Since the sensor itself is composed of a metallic cylinder and a probe, there is the advantage that the price is very low, durability is high, and ventilation is improved because it is unrelated to light. However, since the input impedance is close to infinite, it is sensitive to electrical noise, it is very difficult to configure a measurement circuit with a high noise-to-signal ratio. Accordingly, the ionization chamber was usually used in an integral type that can easily remove noise rather than a pulse type.

However, recently, a technology that can detect alpha particles in real time with a low cost by effectively removing electrical noise, which is the fundamental problem of the ionization chamber, using an analog-type differential circuit was proposed, so a real-time common radon measurer adopting the ionization chamber type has been generally and practically used.

However, it is a still remaining problem that it is difficult to discriminate radon and thoron using alpha spectroscopy in the ionization chamber type unlike the semiconductor type. The reason is that the energy resolution of an ion signal by alpha particles obtained in the ionization chamber is low.

Accordingly, in general and common radon measurer using the ion chamber type, not only radon, but also thoron are measured, so the result is obtained in the type of radon+thoron, which may cause confusion. Accordingly, it was required to install measurer at about 50 cm or more from a wall or a floor in order to avoid interference by thoron when measuring indoor radon concentration.

DISCLOSURE

Technical Problem

The present disclosure has been made in an effort to solve the problems and an objective of the present disclosure is to provide an apparatus for measuring radon and thoron using an ionization chamber making it possible to separately measure radon (Rn-222) and thoron (Rn-220) using a great difference in half-life therebetween in an ionization chamber type that is used to measure indoor radon concentration that is one of the air quality-related factors.

Technical Solution

In order to achieve the objectives described above, a first aspect of the present disclosure provides an apparatus for measuring radon and thoron using an ionization chamber. The apparatus includes: a pump for air inflow suctioning and sending external air to at least one channel; a first sensor module receiving the air sent from the pump for air inflow through a first gas line in the first channel, and outputting an alpha particle detection signal of an electrical signal by detecting alpha (α) particles discharged from radon and thoron included in the air flowing in an ionization chamber having a predetermined size; an air inflow delay module receiving the air sent from the pump for air inflow through a second gas line in a second channel, delaying the air for a predetermined delay time, and then outputting the air; a second sensor module receiving air output from the air inflow delay module and outputting an alpha particle detection signal of an electrical signal by detecting alpha (α) particles discharged from radon and thoron included in the air flowing in the ionization chamber having a predetermined size; and a control module receiving in real time alpha particle detection signals of electrical signals output from the first and second sensor modules, comparing and analyzing waveforms with signal pattern information data according to external noise signal types stored in advance, discriminating normal or abnormal alpha particle detection signals, counting the normal alpha particle detection signals discriminated for a predetermined measurement time, and calculating radioactive ray concentration values on the basis of the counted number of times of the normal alpha particle detection signals.

Each of the first and second sensor modules may include: an ionization chamber having a metallic cylindrical box structure, having nozzles for receiving and discharging air, and generating an electrical field therein when bias power is applied to a surface thereof; a main probe having an end disposed in the ionization chamber and absorbing ion charges produced when alpha (α) decay occurs in the ionization chamber; a guard ring coupled to another side of the ionization chamber such that the main probe passes therethrough, and absorbing and sending a leakage current generated between the ionization chamber and the main probe to a ground; an auxiliary probe having an end disposed in the ionization chamber through the guard ring, spaced apart a predetermined distance from the main probe, and receiving background noise; first and second pre-amplifiers respectively connected to other ends of the main probe and the auxiliary probe, and amplifying electrical micro-signals input from the main probe and the auxiliary probe into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

The bias power that is applied to the surface of the ionization chamber may be a DC voltage of 50V to 300V.

The main probe may detect ion charges produced by a collision of air and alpha particles produced when alpha (α) decay occurs in the ionization chamber.

A length of the auxiliary probe may be smaller than a length of the main probe.

An exposed area of the auxiliary probe may be smaller than an exposed area of the main probe in the ionization chamber.

Each of the first and second sensor modules may include: an ionization chamber having a metallic cylindrical box structure, having nozzles for receiving and discharging air, and generating an electrical field therein when bias power is applied to a surface thereof; a probe having an end disposed in the ionization chamber and absorbing ion charges produced when alpha (α) decay occurs in the ionization chamber; a guard ring coupled to another side of the ionization chamber such that the probe passes therethrough, and absorbing and sending a leakage current generated between the ionization chamber and the probe to a ground; a noise detector connected between the guard ring and the ground, sends a DC-type leakage current generated between the ionization chamber and the probe to the ground, and detects and outputs AC-type noise; first and second pre-amplifiers respectively connected to another end of the probe and an output end of the noise detector, and amplifying electrical micro-signals input from the probe and the noise detector into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

The bias power that is applied to the surface of the ionization chamber may be a DC voltage of 50V to 300V.

The probe may detect ion charges produced by a collision of air and alpha particles produced when alpha (α) decay occurs in the ionization chamber.

The noise detector may be configured by electrically connecting at least any one element of a resistance, a condenser, and a diode in series, in parallel, or in combination of series and parallel.

The air inflow delay module may be configured by stacking up and down a plurality of cases each having a predetermined space such that air flowing therein can stay for a predetermined time, and at least one hole may be formed between the stacked cases to be able to pass the air.

Mirror-like partitions may be installed in the space of at least one of the cases.

The air inflow delay module may be formed by winding an air pipe having a predetermined length several times in a circular spring shape such that air sent from the pump for air inflow is delayed for a predetermined delay time and then output to the second sensor module.

A delay time of the air delay module may be 5 minutes to 10 minutes.

The predetermined measurement time may be 10 minutes to 60 minutes.

The control module may discriminate normal or abnormal alpha particle detection signals by receiving in real time an alpha particle detection signal of an electrical signal output from the first sensor module and by comparing and analyzing a waveform with the signal pattern information data according to external noise signal types stored in advance; may count the normal alpha particle detection signals discriminated for a predetermined measurement time; may calculate a first radioactive ray concentration value on the basis of the counted number of times of the normal alpha particle detection signals.

The control module may discriminate normal or abnormal alpha particle detection signals by receiving in real time an alpha particle detection signal of an electrical signal output from the second sensor module and by comparing and analyzing a waveform with the signal pattern information data according to external noise signal types stored in advance; may count the normal alpha particle detection signals discriminated for a predetermined measurement time; may calculate a first radioactive ray concentration value on the basis of the counted number of times of the normal alpha particle detection signals.

The control module may calculate a third radioactive ray concentration value by calculating a difference between the first radioactive ray concentration value and the second radioactive ray concentration value.

The control module may display the calculated second radioactive ray concentration value as a radon concentration value on a display screen, and may display the calculated third radioactive ray concentration value as a thoron concentration value on the display screen.

A second aspect of the present disclosure provides an apparatus for measuring radon and thoron using an ionization chamber. The apparatus includes: a pump for air inflow suctioning and sending external air to a first gas line having a predetermined length; a sensor module receiving the air sent from the pump for air inflow through the first gas line, outputs the air to a second gas line having a predetermined length, and outputting an alpha particle detection signal of an electrical signal by detecting alpha (α) particles discharged from radon and thoron included in the air flowing in an ionization chamber having a predetermined size through the first gas line; an air valve installed in the second gas line and operating in response to an external control signal to discharge the air sent through the second gas line or stop the gas; and a control module outputting a control signal to open the air valve while outputting a control signal to operate the pump for air inflow for a predetermined operation time, and then discriminating normal or abnormal alpha particle detection signals by receiving in real time an alpha particle detection signal of an electrical signal output from the sensor module and by comparing and analyzing a waveform with a signal pattern information data according to external noise signal types stored in advance; counting the normal alpha particle detection signal discriminated for a predetermined measurement time; calculating a first radioactive ray concentration value on the basis of the counted number of times of the normal alpha particle detection signals; outputting a control signal to stop the pump for air inflow after the pump for air inflow is operated for a predetermined operation time while outputting a control signal to close the air valve; discriminating normal or abnormal alpha particle detection signals by waiting for a predetermined time and then receiving in real time an alpha particle detection signal of an electrical signal output from the sensor module and by comparing and analyzing a waveform with the signal pattern information data according to external noise signal types stored in advance; counting the normal alpha particle detection signal discriminated for a predetermined measurement time; and calculating a second radioactive ray concentration value on the basis of the counted number of times of the normal alpha particle detection signals.

The sensor module may include: an ionization chamber having a metallic cylindrical box structure, having nozzles for receiving and discharging air, and generating an electrical field therein when bias power is applied to a surface thereof; a main probe having an end disposed in the ionization chamber and absorbing ion charges produced when alpha (α) decay occurs in the ionization chamber; a guard ring coupled to another side of the ionization chamber such that the main probe passes therethrough, and absorbing and sending a leakage current generated between the ionization chamber and the main probe to a ground; an auxiliary probe having an end disposed in the ionization chamber through the guard ring, spaced apart a predetermined distance from the main probe, and receiving background noise; first and second pre-amplifiers respectively connected to other ends of the main probe and the auxiliary probe, and amplifying electrical micro-signals input from the main probe and the auxiliary probe into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

The bias power that is applied to the surface of the ionization chamber may be a DC voltage of 50V to 300V.

The main probe may detect ion charges produced by a collision of air and alpha particles produced when alpha (α) decay occurs in the ionization chamber.

A length of the auxiliary probe may be smaller than a length of the main probe.

An exposed area of the auxiliary probe may be smaller than an exposed area of the main probe in the ionization chamber.

The sensor module may include: an ionization chamber having a metallic cylindrical box structure, having nozzles for receiving and discharging air, and generating an electrical field therein when bias power is applied to a surface thereof; a probe having an end disposed in the ionization chamber and absorbing ion charges produced when alpha (α) decay occurs in the ionization chamber; a guard ring coupled to another side of the ionization chamber such that the main probe passes therethrough, absorbing and sending a leakage current generated between the ionization chamber and the probe to a ground; a noise detector connected between the guard ring and the ground, sends a DC-type leakage current generated between the ionization chamber and the probe to the ground, and detects and outputs AC-type noise; first and second pre-amplifiers respectively connected to another end of the probe and an output end of the noise detector, and amplifying electrical micro-signals input from the probe and the noise detector into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

The bias power that is applied to the surface of the ionization chamber may be a DC voltage of 50V to 300V.

The probe may detect ion charges produced by a collision of air and alpha particles produced when alpha (α) decay occurs in the ionization chamber.

The noise detector may be configured by electrically connecting at least any one element of a resistance, a condenser, and a diode in series, in parallel, or in combination of series and parallel.

The control module may calculate a third radioactive ray concentration value by calculating a difference between the first radioactive ray concentration value and the second radioactive ray concentration value.

The control module may display the calculated second radioactive ray concentration value as a radon concentration value on a display screen, and may display the calculated third radioactive ray concentration value as a thoron concentration value on the display screen.

The operation time of the pump for air inflow may be 10 minutes to 60 minutes.

The predetermined measurement time may be 10 minutes to 60 minutes.

The predetermined standby time may be 5 minutes to 10 minutes.

Advantageous Effects

According to the apparatus for measuring radon and thoron using an ionization chamber of the present disclosure described above, there is an advantage that it is possible to separately measure radon (Rn-222) and thoron (Rn-220) using a great difference in half-life therebetween in an ionization chamber type that is used to measure indoor radon concentration that is one of the air quality-related factors.

Further, according to the present disclosure, there is an advantage that it is possible to separately measure the concentrations of radon and thoron in the air by measuring both of radon and thoron or separately measuring only radon even in an apparatus for measuring radon in an ionization chamber type, and then simply comparing the concentrations.

Further, according to the present disclosure, since an expensive semiconductor sensor or a high-specification digital signal processing (DSP) device is not used, there is an advantage that it is possible to manufacture an apparatus that measure radon in real time in an ionization chamber type that enables separation measurement of radon and thoron at a low cost.

DESCRIPTION OF DRAWINGS

FIG. 1 is a block diagram showing the entire of an apparatus for measuring radon and thoron using an ionization chamber according to an embodiment of the present disclosure;

FIG. 2 is a diagram showing in detail an example of first and second sensor modules applied to an embodiment of the present disclosure;

FIG. 3 is a diagram showing in detail another example of first and second sensor modules applied to an embodiment of the present disclosure;

FIG. 4 is a diagram showing a waveform obtained by measuring a typical output signal waveform of first and second sensor modules applied to an embodiment of the present disclosure using an oscilloscope;

FIG. 5 is a diagram schematically showing an example of an air inflow delay module applied to an embodiment of the present disclosure;

FIG. 6 is a diagram schematically showing another example of an air inflow delay module applied to an embodiment of the present disclosure; and FIG. 7 is a block diagram showing the entire of an apparatus for measuring radon and thoron using an ionization chamber according to another embodiment of the present disclosure.

BEST MODE

The objectives, characteristics, and advantages will be described in detail below with reference to the accompanying drawings, so those skilled in the art may easily achieve the spirit of the present disclosure. In describing the present disclosure, detailed descriptions of well-known technologies will be omitted so as not to obscure the description of the present disclosure with unnecessary details.

Terms including ordinal numbers such as 'first', 'second', etc., may be used to describe various components, but the components are not to be construed as being limited to the terms. The terms are used only to distinguish one component from another component. For example, the 'first' component may be named the 'second' component, and vice versa, without departing from the scope of the present disclosure. Terms used in the present specification are used only to describe specific exemplary embodiments rather than limiting the present disclosure. Singular forms are intended to include plural forms unless the context clearly indicates otherwise.

Terminologies used herein were selected as terminologies that are currently used as generally as possible in consideration of the functions herein, but may be changed, depending on the intention of those skilled in the art, precedents, or advent of a new technology. Further, there are terminologies selected by applicant(s) at the applicant(s)' opinion in specific cases, and in these cases, the meanings will be described in the corresponding parts. Accordingly, the terminologies used herein should be defined on the basis of the meanings of the terminologies and the entire specification, not simply the names of the terminologies.

Throughout the present specification, unless explicitly described otherwise, "comprising" any components will be understood to imply the inclusion of other components rather than the exclusion of any other components. Further, the terms "~part", "module", and the like mean a unit for processing at least one function or operation and may be implemented by hardware or software or by a combination of hardware and software.

Hereinafter, embodiments of the present disclosure will be described in detail with reference to the accompanying drawings. However, the embodiments of the present disclosure that will be described hereafter may be modified in various ways and the scope of the present disclosure is not limited to the embodiments that will be described in detail below. Embodiments of the present disclosure are provided to more completely describe the present disclosure to those skilled in the art.

FIG. 1 is a block diagram showing the entire of an apparatus for measuring radon and thoron using an ionization chamber according to an embodiment of the present disclosure, FIG. 2 is a diagram showing in detail an example of first and second sensor modules applied to an embodiment of the present disclosure, FIG. 3 is a diagram showing in detail another example of first and second sensor modules applied to an embodiment of the present disclosure, FIG. 4 is a diagram showing a waveform obtained by measuring a typical output signal waveform of first and second sensor modules applied to an embodiment of the present disclosure using an oscilloscope, FIG. 5 is a diagram schematically showing an example of an air inflow delay module applied to an embodiment of the present disclosure, and FIG. 6 is a diagram schematically showing another example of an air inflow delay module applied to an embodiment of the present disclosure.

Referring to FIGS. 1 to 6, an apparatus for measuring radon and thoron using an ionization chamber according to an embodiment of the present disclosure, in a broad meaning, may include a pump for air inflow 100, a first sensor module 200, an air inflow delay module 300, a second sensor module 400, a control module 500, and a power supply module 600. The apparatus for measuring radon and thoron using an ionization chamber according to an embodiment of the present disclosure may further include a display module 700, a storage module 800, a voice output module 900, and/or a communication module 950. The components shown in FIGS. 1 to 6 are not necessary, so the apparatus for measuring radon and thoron using an ionization chamber according to an embodiment of the present disclosure may include more components or less components.

Hereafter, the components of the apparatus for measuring radon and thoron using an ionization chamber according to an embodiment of the present disclosure are described in detail.

The pump for air inflow 100 suctions external air and sends the air to at least one channel.

It is preferable that the pump for air inflow 100 is a low-noise, high-durability, and small-sized pump for air inflow having a flow rate of about 0.5 1 pm~1.5 1 pm, but it is not limited thereto and any air pump that can suction external air and send the air to at least one channel may be applied.

The first sensor module 200 receives air sent from the pump for air inflow 200 through a first gas line L1 in the first channel and outputs an alpha particle detection signal of an electrical signal by detecting alpha (α) particles discharged from radon (Rn-222) and/or thoron (Rn-220) included in the air flowing in an ionization chamber having a predetermined size.

The air inflow delay module 300 receives the air sent from the pump for air inflow 100 through a second gas line L2 in the second channel, delays the air for a predetermined delay time (preferably, about 5 to 10 minutes), and then outputs the air.

The air inflow delay module 300, for example, as shown in FIG. 5, may be configured by stacking up and down a plurality of cases 300-1 to 300-N each having a predetermined space A such that air flowing therein can stay for a predetermined time, in which at least one hole H may be formed between the stacked cases 300-1 to 300-N to be able to pass the air.

Though not shown in the figures, mirror-like partitions (not shown) may be installed in the space A of at least one of the cases 300-1 to 300-N.

That is, the air inflow delay module 300 shown in FIG. 5 is composed of several rectangular (or triangular, circular, elliptical, polygonal, or the like) floors, similar to a building structure, in which only at least one small hole is formed between the floors to minimally pass air and make the air flowing in the first floor take a sufficiently long time to pass through the uppermost floor.

Meanwhile, considering the half-life of thoron is about 56 seconds, it is preferable to adjust the number and height of the floors such that it takes minimally 5 minutes or more to discharge the intake air. Further, it is more preferable to elongate the movement path of air by making the internal structure of each floor in a mirror shape.

As another example, an air inflow delay module 300', as shown in FIG. 6, may be formed by winding an air pipe 310 having a predetermined length several times in a circular spring shape such that air sent from the pump for air inflow 100 is delayed for a predetermined delay time (preferable, about 5 to 10 minutes) and then output to the second sensor module 400.

That is, the air inflow delay module 300' shown in FIG. 6 is a module formed to have a long channel and a minimum volume by winding a long air pipe 310 through which intake air passes in a circular shape. As described above, the delay time is made minimally 5 minutes or more by adjusting the inner diameter of the air pipe 310 and the number of times of circularly winding.

The second sensor module 400 receives air output from the air inflow delay module 300 and outputs an alpha particle detection signal of an electrical signal by detecting alpha (α) particles discharged from radon (Rn-222) and/or thoron (Rn-220) included in the air flowing in an ionization chamber having a predetermined size.

The first and second sensor modules 200 and 400 are described in more detail with reference to FIGS. 2 to 4.

Referring to FIG. 2, the first and second sensor modules 200 and 400 according to an example applied to an embodiment of the present disclosure, in a broad meaning, include an ionization chamber 210, a main probe 220, a guard ring 230, an auxiliary probe 240, first and second pre-amplifiers 250a and 250b, a differential amplifier 260, a bias power 10, etc.

The ionization chamber 210 has a circular box shape made of a conductive material, in which nozzles (not shown) for receiving and discharge air are formed through the outer surface and/or the bottom. When an electrical field is generated between the main probe 220 in the ionization chamber 210 and the inner surface of the ionization chamber 210 by applying a high-voltage the bias power 10 to the surface of the ionization chamber 210, an ion current generated by alpha (α) decay can be absorbed into the main probe 220. The ionization chamber 210 can be implemented in a simple configuration at a low cost and has an effect that the sensitivity is high due to 3-dimensional measurement.

The high-voltage bias power 10 that is applied to the ionization chamber 210 uses a stable DC voltage of about 50V to 300V (preferable, about 50V to 150V), whereby additional ion charges can be effectively produced when alpha decay occurs in the ionization chamber 210. The power supplied from the high-voltage bias power 10 (e.g., a voltage or a current) may be changed in various ways, depending on the measurement range, the sensitivity, etc.

The main probe 220 is made of a conductive material in a long rod shape to be able to absorb ion charges produced when alpha (α) decay occurs due to a radon (Rn-222) or thoron (RN-220) nuclide in the ionization chamber 210. An end of the main probe 220 is disposed in the ionization chamber 210 and absorbs ion charges produced by alpha (α) decay from the air in the ionization chamber 210.

It is preferable that the main probe 220 is provided to detect alpha particles produced due to alpha (α) decay by radon (Rn-222) or thoron (RN-220) gas from the air in the ionization chamber 210, but it is not limited thereto and may be provided to detect all radioactive gases that discharge alpha (α) particles.

The guard ring 230 is made of a conductive material in a cylindrical shape, is coupled to another side of the ionization chamber 210 such that the main probe 220 passes therethrough, and absorbs and sends a leakage current generated between the ionization chamber 210 and the main probe 220 to the ground.

If the guard ring 230 is not provided, a current signal obtained from the main probe 220 and a leakage current signal are combined, which causes the problem that the signal-to-noise ratio (SNR) is deteriorated.

The auxiliary probe 240 is made of a conductive material in a rod shape having a predetermined length such that background noise can flow inside, and has an end disposed in the ionization chamber 210 through the guard ring 230 and spaced apart a predetermined distance from the main probe 220.

It is preferable that the length of the auxiliary probe 240 is smaller than the length of the main probe 220 and the exposed area of the auxiliary probe 240 is smaller than the exposed area of the main probe 220 in the ionization chamber 210.

The first and second pre-amplifiers 250a and 250b have input ends respectively electrically connected to the main probe 220 and the auxiliary probe 240, thereby primarily amplifying electrical micro-signals input from the main probe 220 and the auxiliary probe 240 into a predetermined magnitude.

Output ends of the first and second pre-amplifiers 250a and 250b are respectively electrically connected to a non-inverting terminal (+) and an inverting terminal (−) of the differential amplifier 260. The differential amplifier 260 can effectively offset noise signals and can detect an alpha particle detection signal by amplifying the electrical signals pre-amplified through the first and second pre-amplifiers 250a and 250b in proportion to the voltage difference of the electrical signals.

That is, as differential amplification is performed by the differential amplifier 260, it is possible to effectively offset noises having the same phase and flowing inside through the main probe 220 and the auxiliary probe 240 and it is possible to accurately and quickly obtain a high-sensitivity and low-noise alpha particle detection signal.

Referring to FIG. 3, the first and second sensor modules 200 and 400 according to another example applied to an embodiment of the present disclosure, in a broad meaning, include an ionization chamber 210', a probe 220', a guard ring 230', a noise detector 240', first and second preamplifiers 250a' and 250b', a differential amplifier 260', etc.

The ionization chamber 210' has a circular box shape made of a conductive material, in which nozzles (not shown) for receiving and discharge air are formed through the outer surface and/or the bottom. When an electrical field is generated between the probe 220' in the ionization chamber 210' and the inner surface of the ionization chamber 210' by applying a high-voltage bias power 10' to the surface of the ionization chamber 210', an ion current generated by alpha (α) decay can be absorbed into the probe 220'. The ionization chamber 210' can be implemented in a simple configuration at a low cost and has an effect that it can perform 3-dimensional measurement.

The high-voltage bias power 10' applied to the ionization chamber 210' is a stable DC voltage of about 50V to 300V (preferable, about 50V to 150V), whereby additional ion charges can be effectively produced when alpha decay occurs in the ionization chamber 210'. The power supplied from the high-voltage bias power 10' (e.g., a voltage or a current) may be changed in various ways, depending on the measurement range, the sensitivity, etc.

The probe 220' is made of a conductive material in a long rod shape to be able to absorb ion charges produced when alpha (α) decay occurs due to radon (Rn-222) or thoron (RN-220) nuclides in the ionization chamber 210'. An end of the probe 220' is disposed in the ionization chamber 210' and absorbs ion charges produced by alpha (α) decay from the air in the ionization chamber 210'.

It is preferable that the main probe 220' is provided to detect alpha particles produced due to alpha (α) decay by radon (Rn-222) or thoron (RN-220) gas from the air in the ionization chamber 210', but it is not limited thereto and may be provided to detect all radioactive gases that discharge alpha (α) particles.

The guard ring 230' is made of a conductive material in a cylindrical shape, is coupled to another side of the ionization chamber 210' such that the probe 220' passes therethrough, and absorbs and sends a leakage current generated between the ionization chamber 210' and the probe 220' to the ground.

The noise detector 240' is electrically connected between the guard ring 230' and the ground and maintains the potential of the guard ring 230' a little bit higher than the ground, thereby sending a DC-type leakage current generated between the ionization chamber 210' and the probe 220' to the ground and detecting and outputting an AC-type noise to the second pre-amplifier 150b'.

Accordingly, another embodiment of the present disclosure, unlike the previous example, is characterized removing the auxiliary probe 240 and installing the noise detector 240' to function as the auxiliary probe 240 using the guard ring 230', and has the advantage that it is structurally simpler than the previous embodiment.

It is preferable to configure the noise detector 240', for example, by electrically connecting at least any one element of a resistance, a condenser, and a diode in series, in parallel, or in combination of series and parallel.

The first and second pre-amplifiers 250a' and 250b' have input ends respectively electrically connected to output ends of the probe 220' and the noise detector 240', thereby primarily amplifying electrical micro-signals input from the probe 220' and the noise detector 240' into a predetermined magnitude.

Output ends of the first and second pre-amplifiers 250a' and 250b' are respectively electrically connected to a non-inverting terminal (+) and an inverting terminal (−) of the differential amplifier 260'. The differential amplifier 260' can effectively offset noise signals and can detect an alpha particle detection signal by amplifying the electrical signals pre-amplified through the first and second pre-amplifiers 250a' and 250b' in proportion to the voltage difference of the electrical signals.

That is, as differential amplification is performed by the differential amplifier 260', it is possible to effectively offset noises having the same phase and flowing inside through the probe 220' and the noise detector 240' and it is possible to accurately and quickly obtain a high-sensitivity and low-noise alpha particle detection signal.

FIG. 4 is a resultant waveform obtained by measuring typical output signal waveforms of the first and second sensor modules applied to an embodiment of the present disclosure, using an oscilloscope. It is possible to easily know that noises were greatly decreased and the difference between an alpha particle detection signal and a background noise signal, that is, the signal-to-noise ratio was very improved (a very large and clean waveform-B) when the components of the present disclosure were applied. Accordingly, there is an effect that the production frequency of alpha particles are more accurately detected, which results from applying an ionization chamber to an apparatus for measuring radon and thoron.

The control module 500 generally controls the apparatus for measuring radon and thoron using an ionization chamber according to an embodiment of the present disclosure, and is preferably a micro control unit (MCU). In particular, the control module 500 receives in real time alpha particle detection signals of electrical signals output from the first and second sensor modules 200 and 400, compares and analyzes waveforms with signal pattern information data according to external noise signal types stored in advance, and discriminates normal or abnormal alpha particle detection signals.

Further, the control module 500 counts the normal alpha particle detection signal discriminated for a predetermined measurement time (e.g., 10 minutes, 30 minutes, one hour, etc.), and calculates radioactive ray concentration values on the basis of the counted number of times of the normal alpha particle detection signals.

It is preferable that the predetermined measurement time is in the range of about 10 minutes to 60 minutes.

The control module 500 can receive in real time an alpha particle detection signal of an electrical signal output from the first sensor module 200, compare and analyzes the waveform with signal pattern information data according to external noise signal types stored in advance, discriminate normal or abnormal alpha particle detection signal, count the normal alpha particle detection signals discriminated for a predetermined measurement time (e.g., 10 minutes, 30 minutes, 1 hour, etc.), and calculate a first radioactive ray concentration value on the basis of the counted number of times of the normal alpha particle detection signals.

The control module 500 can receive in real time an alpha particle detection signal of an electrical signal output from the second sensor module 400, compare and analyze the waveform with signal pattern information data according to external noise signal types stored in advance, discriminate normal or abnormal alpha particle detection signal, count the normal alpha particle detection signals discriminated for a predetermined measurement time (e.g., 10 minutes, 30 minutes, 1 hour, etc.), and calculate a second radioactive ray concentration value on the basis of the counted number of times of the normal alpha particle detection signals.

The control module 500 can calculate a third radioactive ray concentration value by calculating the difference between the calculated first radioactive ray concentration value and the calculated second radioactive ray concentration value.

The control module 500 can display the calculated second radioactive ray concentration value as a radon concentration value on a display screen, that is, the display module 700, and can display the calculated third radioactive ray concentration value as a thoron concentration value on the display screen, that is, the display module 700.

Various embodiments described herein, for example, may be implemented in a recording medium that can be read out through a computer or similar devices using hardware, software, or a combination thereof.

According to hardware implementation, an embodiment can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for executing functions. In some cases, such embodiments may be implemented by the control module 500.

According to software implementation, embodiments such as a procedure or a function may be implemented with a separate software module that causes execution of at least one function or operation. A software code may be implemented by a software application written in an appropriate program language. The software code may be stored in the storage module 800 and may be executed by the control module 500.

The power supply module 600 supplies necessary power to the modules, that is, the pump for air inflow 100, the first sensor module 200, the air inflow delay module 300, the second sensor module 400, the control module 500, the display module 700, the storage module 800, the voice output module 900, and/or the communication module 950. It is preferable that the power supply module 600 is configured to change general AC power (e.g., AC 220V) into DC power in order to continuously supply power, but it is not limited thereto and may be a common portable battery.

The power supply module 600 may be controlled by the control module 500 to supply necessary power to the bias powers 10 and 10' in the first and second sensor modules 200 and 400.

Further, the display module 700 may be controlled by the control module 500 to display various states of the apparatus (e.g., whether there is an error in the components including various sensors, and an alarm) including the calculated first to third radioactive ray concentration value on the screen.

The display module 700, for example, may include at least one of a liquid crystal display (LCD), a light emitting diode (LED), a thin film transistor-liquid crystal display (TFT LCD), an organic light emitting diode (OLED), a flexible display, a plasma display panel (PDP), an ALiS panel, a digital light processing (DLP) panel, a silicon liquid crystal (LCoS) panel, a surface-conduction electron-emitter display (SED), a field emission display (FED), a laser TV (a quantum dot laser, a liquid crystal laser), a ferro liquid display (FLD), an interferometric modulator display (iMoD), a thick dielectric electroluminescent (TDEL) display, a quantum dot display (QD-LED), a telescopic pixel display (TPD), an organic light emitting transistor (OLEDT), a laser fluorescent display (LPD), and a 3D display, but it is not limited thereto and may include anything as long as it can display numbers, characters, or symbols.

The storage module 800 stores various state information data of the apparatus (e.g., whether there is an error in the components including various sensors and alarm information data) including the calculated first to third radioactive ray concentration values in a database (DB) for each date and/or each day and/or each week and/or each month and/or each quarter and/or each year.

The storage module 800, for example, may include at least one type of storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The voice output module 900 is controlled by the control module 500 to output various state information data of the apparatus (e.g., whether there is an error in the components including various sensors and alarm information data) including the calculated first to third radioactive ray concentration values using a voice so that a user can aurally hear them.

It is preferable that the voice output module 900 is a common speaker, but it not limited thereto and may be a connection jack including a voice amplification circuit so that a user can aurally hear them through an earphone or a headphone.

The communication module 950 is controlled by the control module to transmit various state information data of the apparatus (e.g., whether there is an error in the components including various sensors and alarm information data) including the calculated first to third radioactive ray concentration values to an external user terminal 30 through the communication net.

The communication net 20, for example, may be a near field communication (e.g., Bluetooth communication, Zig-Bee communication, ultra-wideband (UWB) communication, radio frequency identification (RFID) communication, or infrared (IR) communication) network, Ethernet, or a mobile communication network, may be a communication network that is a high-speed backbone network of a large communication network, and may be a next-generation wireless network including the internet, WiFi for providing high-speed multimedia services, Wibro, Wimax, etc.

The internet means a global open computer network structure providing a TCP/IP protocol and various services existing in the upper hierarchy, that is, hypertext transfer protocol (HTTP), telnet, file transfer protocol (FTP), domain name system (DNS), simple mail transfer protocol (SMTP), simple network management protocol (SNMP), network file service (NFS), and network information service (NIS), and provides an environment enables the user terminal 30 to be connected to the communication module 950. The internet may be wired or wireless internet and may be a core network integrated with a wired public network, a wireless mobile communication network, a portable internet, or the like.

If the communication net 20 is a mobile communication network, it may be a synchronization type mobile communication network or a non-synchronization type mobile communication network. As an embodiment of the on-synchronization type mobile communication network, there may be a wideband code division multiple access (WCDMA) type communication network. In this case, though not shown in the figures, the mobile communication network, for example, may include a radio network controller (RNC), etc. Although the WCDMA network is exemplified, it may be the next-generation communication network such as a 3G LTE network, a 4G network, and a 5G network, or other IP-based IP networks. The communication net 20 transmits signals and data between the user terminal 30 and the communication module 950.

The external user terminal 30 can be provided with various state information data of the apparatus (e.g., whether there is an error in the components including various sensors and alarm information data) including the calculated first to third radioactive ray concentration values transmitted from the communication module 950 through a pre-installed radon and thoron detection-related application service, and can display them on a display screen of the user terminal 30 in a text and/or graphic type so that the user can visually see them.

It is preferable that the user terminal 30 applied to an embodiment of the present disclosure is any one mobile terminal device of a smart phone, a smart pad, or a smart note that performs communication through wireless internet or portable internet. Further, the user terminal 30 may generally mean all wire-wireless home appliance/communication devices having a user interface for connection to the communication module 950 such as a personal computer, a notebook computer, a palm computer, a mobile play-station, a digital multimedia broadcasting (DMB) phone having a communication function, a tablet PC, and iPad.

In the apparatus for measuring radon and thoron using an ionization chamber according to an embodiment of the present disclosure described above, air suctions through the pump for air inflow 100 that is continuously operated is sent to the first and second sensor modules 200 and 400 through two channels. In this case, air is quickly sent to the first sensor module 200 usually within about 5 seconds through only the common first gas line L1 and is delayed usually about 5 minutes or more and then sent to the second sensor module 400 due to the air inflow delay module 300, 300' inserted in the second gas line L2.

Accordingly, both radon and thoron included in the inflow air is delivered to the first sensor module 200 practically without a loss, but only radon is usually delivered to the second sensor module 400. The reason results from the difference in half-life of the two radioactive gases.

That is, this is because since the half-life of radon is about 3.8 days and the half-life of thoron is about 56 seconds, the amount of thoron decreases to about 1/32 or less while it passes through the air inflow delay module 300, 300' for five minutes or more.

Accordingly, alpha decay signals of both of radon and thoron are output from the first sensor module 200 and transmitted to the control module 500, but the alpha decay signal of only radon, that is, an alpha particle detection signal is output from the second sensor module 400 and transmitted to the control module 500.

Meanwhile, since the concentrations of radon and thoron are proportioned with the number of times of output of a signal per hour of the first and second sensor modules 200 and 400, the control unit 500 can obtain the concentration values of radon and thoron from a signal from the first sensor module 200 and the concentration value of only radon from a signal from the second sensor module 400. Accordingly, it is possible to obtain the concentration values of both of radon and thoron by obtaining the difference between the two concentration values.

FIG. 7 is a block diagram showing the entire of an apparatus for measuring radon and thoron using an ionization chamber according to another embodiment of the present disclosure.

Referring to FIG. 7, an apparatus for measuring radon and thoron using an ionization chamber according to another embodiment of the present disclosure, in a broad meaning, includes a pump for air inflow 100', a sensor module 200', an air valve 300', a control module 400', a power supply module 500', etc. The apparatus for measuring radon and thoron using an ionization chamber according to another embodiment of the present disclosure may further include a display module 600', a storage module 700', a voice output module 800', and/or a communication module 900'. The components shown in FIG. 7 are not necessary, so the apparatus for measuring radon and thoron using an ionization chamber according to another embodiment of the present disclosure may include more components or fewer components.

Hereafter, the components of the apparatus for measuring radon and thoron using an ionization chamber according to another embodiment of the present disclosure are described in detail.

The pump for air inflow' suction external air and sends the air to a first gas line L1' having a predetermined length.

It is preferable that the pump for air inflow 100', similar to the embodiment of the present disclosure described above, is a low-noise, high-durability, and small-sized air intake pump having a flow rate of about 0.5 1 pm~1.5 1 pm, but it is not limited thereto and any air pump that can suction external air and send the air to at least one path may be applied.

The sensor module 200' receives the air sent from the pump for air inflow 100' through the first gas line L1' and outputs the air to a second gas line L2' having a predetermined length. Further, the sensor module 200' detects alpha (α) particles discharged from radon and/or thoron included in the air flowing into an ionization chamber having a predetermined size through the first gas line L1', and outputs an alpha particle detection signal of an electrical signal.

The second module 200' is the same as the first and second sensor modules 200 and 400 applied to the embodiment of the present disclosure described above, so detailed description of the sensor module 200' refers to the detailed description of the embodiment of the present disclosure described above (see FIGS. 2 to 4).

The air valve 300' is installed in the second gas line L2' and is opened or closed to discharge the air sent through the second gas line L2' to the outside or stop the air in response to an external control signal, that is, a control signal output from the control module 400'.

The control module 400' generally controls the apparatus for measuring radon and thoron using an ionization chamber according to another embodiment of the present disclosure, so it is preferably a micro control unit (MCU). In particular, the control module 400' outputs a control signal to open the air valve 300' and outputs a control valve to operate the pump for air inflow 100' for a predetermined operation time (preferably, about 10 minutes to 60 minutes). Then, the control module 400' receives in real time an alpha particle detection signal of an electrical signal output from the sensor module 200', compares and analyzes the waveform with signal pattern information data according to external noise signal types stored in advance, and discriminates normal or abnormal alpha detection signals.

Further, the control module 400' counts the normal alpha particle detection signal discriminated for a predetermined measurement time (preferably, 10 minutes to 60 minutes), and calculates a first radioactive ray concentration value on the basis of the counted number of times of the normal alpha particle detection signals.

Further, the control module 400' outputs a control signal to stop the pump for air inflow 100' after the pump for air inflow 100' is operated for the predetermined operation time and outputs a control signal to close the air valve 300'. The control module 400' waits for a predetermined standby time (preferably, about 5 minutes to 10 minutes), then receives in real time an alpha particle detection signal of an electrical signal output from the sensor module 200', compares and analyzes the waveform with signal pattern information data according to external noise signal types stored in advance, and discriminates normal or abnormal alpha detection signals.

Further, the control module 400' counts the normal alpha particle detection signals discriminated for a predetermined measurement time and calculates a second radioactive ray concentration value on the basis of the number of times of the counted normal alpha particle detection signals.

Further, the control module 400' can calculate a third radioactive ray concentration value by calculating the difference between the calculated first radioactive ray concentration value and the calculated second radioactive ray concentration value.

The control module 400' can display the calculated second radioactive ray concentration value as a radon concentration value on a display screen, that is, the display module 600', and can display the calculated third radioactive ray concentration value as a thoron concentration value on the display screen, that is, the display module 600'.

Further, the power supply module 500', the display module 600', the storage module 700', the voice output module 800', and the communication module 900' are the same as the power supply module 600, the display module 700, the storage module 800, the voice output module 900, and the communication module 950 applied to the embodiment of the present disclosure described above, so detailed description thereof refers to the detailed description of the embodiment of the present disclosure described above (see FIG. 1).

The apparatus for measuring radon and thoron using an ionization chamber according to another embodiment of the present disclosure is different from the embodiment of the present disclosure described above (see FIG. 1) in that the air valve 300' is used without the air inflow delay module 300, only one sensor module 200' is used, and the control module 400' controls the operation of the pump for air inflow 100' and the air valve 300'.

It was possible to simultaneously measure radon and thoron in the embodiment of the present disclosure described above, but radon and thoron are sequentially measured in another embodiment of the present disclosure. The concentration values of radon and thoron are measured first by opening the air valve 300', continuously operating the pump for air inflow 100' for a predetermined operation time, for example, about 10 minutes to 60 minutes, and inputting an alpha decay signal, that is, an alpha particle detection signal measured by the sensor module 200' to the control module 400' while passing external air through the sensor module 200'.

Thereafter, the concentration value of only radon is measured by stopping the pump for air inflow 100', closing the air valve 300', waiting for a about 5 minutes or more such that the concentration decreases to 1/32 or less due to the short half-life of thoron, and then inputting an alpha decay signal, that is, an alpha particle detection signal measured by the sensor module 200' for the same time as the operation time of the pump for air inflow 100, for example, 10 minutes to 60 minutes to the control module 400'. It is possible to know the concentration values of radon and thoron from the two measurement results.

Although preferred embodiments of an apparatus for measuring radon and thoron using an ionization chamber according to the present disclosure were described above, the present disclosure is not limited thereto and may be modified in various ways without departing from claims, the detailed description, and the accompanying drawings, and they are also included in the present disclosure.

INDUSTRIAL APPLICABILITY

The present disclosure can be widely used in apparatuses for measuring radon and thoron.

The invention claimed is:

1. An apparatus for measuring radon and thoron using an ionization chamber, the apparatus comprising:
   a pump for air inflow suctioning and sending external air to at least one channel;
   a first sensor module receiving the air sent from the pump for air inflow through a first gas line in the first channel, and outputting an alpha particle detection signal of an electrical signal by detecting alpha ($\alpha$) particles discharged from radon and thoron included in the air flowing in an ionization chamber having a predetermined size;
   an air inflow delay module receiving the air sent from the pump for air inflow through a second gas line in a second channel, delaying the air for a predetermined delay time, and then outputting the air;
   a second sensor module receiving air output from the air inflow delay module and outputting an alpha particle detection signal of an electrical signal by detecting alpha ($\alpha$) particles discharged from radon and thoron included in the air flowing in the ionization chamber having a predetermined size; and
   a control module receiving in real time alpha particle detection signals of electrical signals output from the first and second sensor modules, comparing and analyzing waveforms with signal pattern information data according to external noise signal types stored in advance, discriminating normal or abnormal alpha particle detection signals, counting the normal alpha particle detection signals discriminated for a predetermined measurement time, and calculating radioactive ray concentration values on the basis of the counted number of times of the normal alpha particle detection signals.

2. The apparatus of claim 1, wherein each of the first and second sensor modules comprises:
   an ionization chamber having a metallic cylindrical box structure, having nozzles for receiving and discharging air, and generating an electrical field therein when bias power is applied to a surface thereof;
   a main probe having an end disposed in the ionization chamber and absorbing ion charges produced when alpha ($\alpha$) decay occurs in the ionization chamber;
   a guard ring coupled to another side of the ionization chamber such that the main probe passes therethrough, and absorbing and sending a leakage current generated between the ionization chamber and the main probe to a ground;
   an auxiliary probe having an end disposed in the ionization chamber through the guard ring, spaced apart a predetermined distance from the main probe, and receiving background noise;

first and second pre-amplifiers respectively connected to other ends of the main probe and the auxiliary probe, and amplifying electrical micro-signals input from the main probe and the auxiliary probe into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

3. The apparatus of claim 2, wherein the bias power that is applied to the surface of the ionization chamber is a DC voltage of 50V to 300V.

4. The apparatus of claim 2, wherein the main probe detects ion charges produced by a collision of air and alpha particles produced when alpha (α) decay occurs in the ionization chamber.

5. The apparatus of claim 2, wherein a length of the auxiliary probe is smaller than a length of the main probe.

6. The apparatus of claim 2, wherein an exposed area of the auxiliary probe is smaller than an exposed area of the main probe in the ionization chamber.

7. The apparatus of claim 1, wherein each of the first and second sensor modules comprises:

an ionization chamber having a metallic cylindrical box structure, having nozzles for receiving and discharging air, and generating an electrical field therein when bias power is applied to a surface thereof;

a probe having an end disposed in the ionization chamber and absorbing ion charges produced when alpha (α) decay occurs in the ionization chamber;

a guard ring coupled to another side of the ionization chamber such that the main probe passes therethrough, absorbing and sending a leakage current generated between the ionization chamber and the probe to a ground;

a noise detector connected between the guard ring and the ground, sends a DC-type leakage current generated between the ionization chamber and the probe to the ground, and detects and outputs AC-type noise;

first and second pre-amplifiers respectively connected to another end of the probe and an output end of the noise detector, and amplifying electrical micro-signals input from the probe and the noise detector into a predetermined magnitude; and a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

8. The apparatus of claim 7, wherein the bias power that is applied to the surface of the ionization chamber is a DC voltage of 50V to 300V.

9. The apparatus of claim 7, wherein the probe detects ion charges produced by a collision of air and alpha particles produced when alpha (α) decay occurs in the ionization chamber.

10. The apparatus of claim 7, wherein the noise detector is configured by electrically connecting at least any one element of a resistance, a condenser, and a diode in series, in parallel, or in combination of series and parallel.

11. The apparatus of claim 1, wherein the air inflow delay module is configured by stacking up and down a plurality of cases each having a predetermined space such that air flowing therein can stay for a predetermined time, and at least one hole is formed between the stacked cases to be able to pass the air.

12. The apparatus of claim 11, wherein mirror-like partitions are installed in the space of at least one of the cases.

13. The apparatus of claim 1, wherein the air inflow delay module is formed by winding an air pipe having a predetermined length several times in a circular spring shape such that air sent from the pump for air inflow is delayed for a predetermined delay time and then output to the second sensor module.

14. The apparatus of claim 1, wherein a delay time of the air delay module is 5 minutes to 10 minutes and the predetermined measurement time is 10 minutes to 60 minutes.

15. The apparatus of claim 1, wherein the control module discriminates normal or abnormal alpha particle detection signals by receiving in real time an alpha particle detection signal of an electrical signal output from the first sensor module and by comparing and analyzing a waveform with the signal pattern information data according to external noise signal types stored in advance; counts the normal alpha particle detection signals discriminated for a predetermined measurement time; calculates a first radioactive ray concentration value on the basis of the counted number of times of the normal alpha particle detection signals; discriminates normal or abnormal alpha particle detection signals by receiving in real time an alpha particle detection signal of an electrical signal output from the second sensor module and by comparing and analyzing a waveform with the signal pattern information data according to external noise signal types stored in advance; counts the normal alpha particle detection signals discriminated for a predetermined measurement time; calculates a second radioactive ray concentration value on the basis of the counted number of times of the normal alpha particle detection signals; calculates a third radioactive ray concentration value by calculating a difference between the first radioactive ray concentration value and the second radioactive ray concentration value; displays the calculated second radioactive ray concentration value as a radon concentration value on a display screen, and displays the calculated third radioactive ray concentration value as a thoron concentration value on the display screen.

16. An apparatus for measuring radon and thoron using an ionization chamber, the apparatus comprising:

a pump for air inflow suctioning and sending external air to a first gas line having a predetermined length;

a sensor module receiving the air sent from the pump for air inflow through the first gas line, outputs the air to a second gas line having a predetermined length, and outputting an alpha particle detection signal of an electrical signal by detecting alpha (α) particles discharged from radon and thoron included in the air flowing in an ionization chamber having a predetermined size through the first gas line;

an air valve installed in the second gas line and operating in response to an external control signal to discharge the air sent through the second gas line or stop the gas; and a control module outputting a control signal to open the air valve while outputting a control signal to operate the pump for air inflow for a predetermined operation time, and then discriminating normal or abnormal alpha particle detection signals by receiving in real time an alpha particle detection signal of an electrical signal output from the sensor module and by comparing and analyzing a waveform with a signal pattern information data according to external noise signal types stored in advance; counting the normal alpha particle detection signal discriminated for a predetermined measurement time; calculating a first radioactive ray concentration value on the basis of the counted number of times of the normal alpha particle detection signals; outputting a control signal to stop the pump for air inflow after the pump for air inflow is operated for a predetermined operation time while outputting a control signal to close the air valve; discriminating normal or abnormal alpha particle detection signals by waiting for a predetermined time and then receiving in real time an alpha particle detection signal of an electrical signal output from the sensor module and by comparing and analyzing a waveform with the signal pattern information data according to external noise signal types stored in advance; counting the normal alpha particle detection signal discriminated for a predetermined measurement time; and calculating a second radioactive ray concentration value on the basis of the counted number of times of the normal alpha particle detection signals.

17. The apparatus of claim 16, wherein the sensor module comprises:
an ionization chamber having a metallic cylindrical box structure, having nozzles for receiving and discharging air, and generating an electrical field therein when bias power is applied to a surface thereof;
a main probe having an end disposed in the ionization chamber and absorbing ion charges produced when alpha (α) decay occurs in the ionization chamber;
a guard ring coupled to another side of the ionization chamber such that the main probe passes therethrough, and absorbing and sending a leakage current generated between the ionization chamber and the main probe to a ground;
an auxiliary probe having an end disposed in the ionization chamber through the guard ring, spaced apart a predetermined distance from the main probe, and receiving background noise;
first and second pre-amplifiers respectively connected to other ends of the main probe and the auxiliary probe, and amplifying electrical micro-signals input from the main probe and the auxiliary probe into a predetermined magnitude; and
a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

18. The apparatus of claim 17, wherein the bias power that is applied to the surface of the ionization chamber is a DC voltage of 50V to 300V.

19. The apparatus of claim 17, wherein the main probe detects ion charges produced by a collision of air and alpha particles produced when alpha (α) decay occurs in the ionization chamber.

20. The apparatus of claim 17, wherein a length of the auxiliary probe is smaller than a length of the main probe.

21. The apparatus of claim 17, wherein an exposed area of the auxiliary probe is smaller than an exposed area of the main probe in the ionization chamber.

22. The apparatus of claim 16, wherein the sensor module comprises:
an ionization chamber having a metallic cylindrical box structure, having nozzles for receiving and discharging air, and generating an electrical field therein when bias power is applied to a surface thereof;
a probe having an end disposed in the ionization chamber and absorbing ion charges produced when alpha (α) decay occurs in the ionization chamber;
a guard ring coupled to another side of the ionization chamber such that the main probe passes therethrough, absorbing and sending a leakage current generated between the ionization chamber and the probe to a ground;
a noise detector connected between the guard ring and the ground, sends a DC-type leakage current generated between the ionization chamber and the probe to the ground, and detects and outputs AC-type noise;
first and second pre-amplifiers respectively connected to another end of the probe and an output end of the noise detector, and amplifying electrical micro-signals input from the probe and the noise detector into a predetermined magnitude; and
a differential amplifier having a non-inverting terminal (+) and an inverting terminal (−) respectively connected to output ends of the first and second pre-amplifiers, and offsetting noise signals and outputting an alpha particle detection signal by amplifying a voltage difference of electrical signals pre-amplified through the first and second pre-amplifiers.

23. The apparatus of claim 22, wherein the bias power that is applied to the surface of the ionization chamber is a DC voltage of 50V to 300V.

24. The apparatus of claim 22, wherein the probe detects ion charges produced by a collision of air and alpha particles produced when alpha (α) decay occurs in the ionization chamber.

25. The apparatus of claim 22, wherein the noise detector is configured by electrically connecting at least any one element of a resistance, a condenser, and a diode in series, in parallel, or in combination of series and parallel.

26. The apparatus of claim 16, wherein the control module calculates a third radioactive ray concentration value by calculating a difference between the first radioactive ray concentration value and the second radioactive ray concentration value; displays the calculated second radioactive ray concentration value as a radon concentration value on a display screen, and displays the calculated third radioactive ray concentration value as a thoron concentration value on the display screen.

27. The apparatus of claim 16, wherein the operation time of the pump for air inflow is 10 minutes to 60 minutes, the predetermined measurement time is 10 minutes to 60 minutes, and the predetermined standby time is 5 minutes to 10 minutes.

* * * * *